June 24, 1969
L. D. COWDIN
3,451,430
FLUID CONTROL VALVE
Filed Nov. 16, 1966
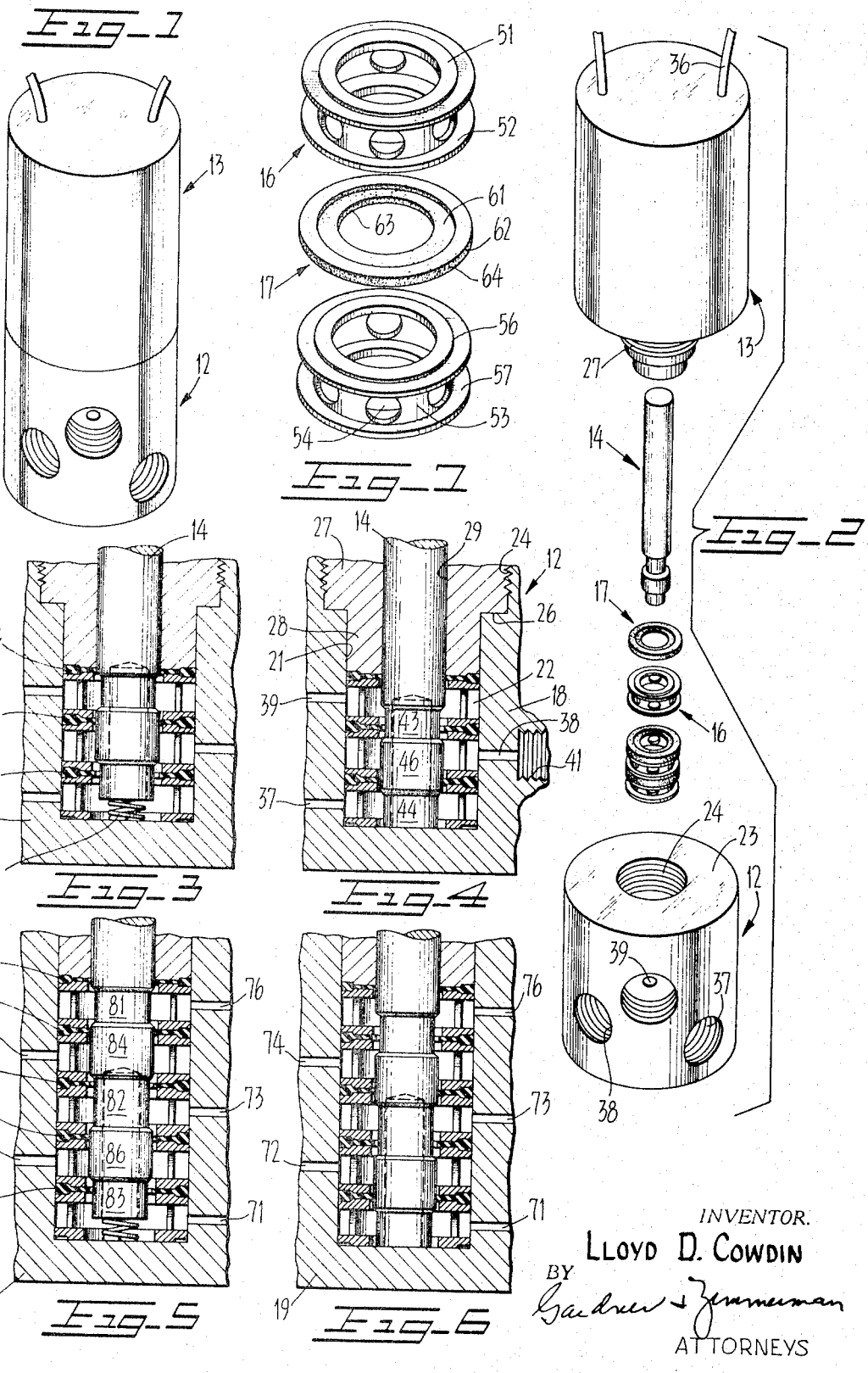
INVENTOR.
LLOYD D. COWDIN
BY
Gardner & Zimmerman
ATTORNEYS 3,451,430
FLUID CONTROL VALVE
Lloyd D. Cowdin, P.O. Box 814,
San Leandro, Calif. 94577
Filed Nov. 16, 1966, Ser. No. 594,729
Int. Cl. F16k 11/07, 31/06
U.S. Cl. 137—625.69                                        4 Claims

ABSTRACT OF THE DISCLOSURE

A valve is described which comprises a cylindrical body having an axial bore in which a cylindrical rod is concentrically disposed. A plurality of ports extend radially through the body to the bore and are axially spaced relative to one another along the body. A plurality of annular seal rings circumscribe the rod and are positioned within the bore of the body between adjacent ports. The outer peripheral portion of each seal ring sealingly engages the body, and the inner peripheral portion sealingly engages the rod. However, the rod is provided with diametrically reduced portions which, upon axial movement of the rod, are adapted to be aligned with the sealing rings to permit fluid flow between such rod portion and the ring, and hence, between adjacent ports.

---

This invention generally relates to valves for the control of gaseous or liquid fluids, and is more particularly directed towards an air control valve which may be operated by a solenoid or other similar actuating mechanism.

In many instances it is desirable to repeatedly place various air lines in and out of flow communication, and/or alternate the flow path between a plurality of lines. One of the most effective ways of performing this general type of operation is by means of a solenoid actuated valve.

It is an object of the present invention to provide an improved air valve which is capable of handling high flow rates at high working pressures, although of small physical size, and which will produce fast positive action for controlling pneumatic equipment or the like.

Another object of the invention is to provide a valve of the above type which is extremely simple in construction and operation, capable of millions of operating cycles without appreciable wear, and which may be completely disassembled for cleaning or the like without requiring special tools, and without disconnecting line connections going to or from the valve.

A further object of the invention is to provide a valve of the character described which can readily be produced from a basic design, and yet varied to define different multiway valve arrangements.

A still further object of the invention is to provide a device as described above in which a simple solenoid actuation will produce rapid and effective changes in directions, etc., of air flow.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to said drawing:

FIGURE 1 is a perspective view of the solenoid valve of the present invention.

FIGURE 2 is an exploded perspective view of the structure shown in FIGURE 1.

FIGURE 3 is a vertical cross sectional view of the valve, but with the ports realigned circumferentially for convenience of explanation.

FIGURE 4 is a view similar to FIGURE 3, but showing the position of the parts upon actuation of the solenoid.

FIGURES 5 and 6 are similar to FIGURES 3 and 4 respectively but illustrating a valve construction with additional air lines connected thereto.

FIGURE 7 is an enlarged exploded perspective view of the valve ring and gasket construction.

The device of the present invention is illustrated in the drawing as a solenoid valve, and in broad terms, includes a valve body 12, a solenoid 13, a spool or rod 14 actuated by the solenoid, a plurality of valve elements 16 and gasket sealing rings 17. As will be later described in more detail, the body is provided with a plurality of air line connections, and movement of the spool 14 will result in various flow patterns between such connections.

The body 12 is shown of cylindrical configuration, having a side wall 18 terminating in an end wall 19. The body is provided with an axial bore 21 defining a chamber 22 extending from end wall 19 to the other end surface 23 of the body. Such latter portion is provided with a threaded counterbore 24 in alignment with bore 21 with a transaxial shoulder 26 defined at the juncture of the two bores. As best seen in FIGURE 2 of the drawing, solenoid 13 is of cylindrical shape of the same outer shape as body 12 and includes a threaded extension 27 permitting ready attachment of the solenoid to the counterbore 24 of the body. The extension has a diametrically reduced portion 28 received in the upper portion of the bore.

Extension 27 is provided with an axial bore 29 communicating with chamber 22 and extending through the bore for relative axial translation in the spool 14. A spring 31 is interposed between the end wall 19 of the valve body and the distal end portion of spool 14, normally maintaining the spool in the position illustrated in FIGURE 3 of the drawing. However, upon energization of the solenoid through electrical leads 36, the spool is extended against the resistanec of spring 31 to assume the position shown in FIGURE 4 of the drawing. The effect of such spool movement will be later discussed in greater detail.

For purpose of explanation, FIGURES 1 through 4 of the drawing disclose a so-called three-way valve, and there is accordingly provided in the wall 18 three ports, designated at 37, 38 and 39, respectively. So long as these ports are at different axial locations along the wall 18, their circumferential disposition is not material. Thus, in practice, all three ports may be along one specific arcuate segment of the body, as shown in FIGURES 1 and 2, but for ease in illustration and explanation, in the cross-sectional views, the port 38 is shown diametrically opposed to ports 37 and 39. The outermost end of each port preferably communicates with an enlarged internally threaded bore 41 extending to the outer surface of body wall 18, thereby permitting easy threaded attachment of conduits (not shown) to the respective ports. It is of course understood that all such ports are in communication with the chamber 22.

By means of valve elements 16 presently to be described in cooperation with the spool 14, movement of the latter will result, for example, with port 38 being in flow communication with port 37 in one position of the spool and with port 39 in another spool position. The spool or rod 14, has a normal diameter substantially the same as that of the bore 29, but has two sections 43 and 44 of radially reduced size, the latter section being at the end of the spool, while section 43 is spaced therefrom by a normal sized section 46.

Each of the valve elements 19, as best shown in FIGURE 7, includes an annular top 51, an annular bottom 52, and a side wall 53 extending axially between medial portions of the top and bottom. Side wall 53 is provided with a plurality of apertures 54 permitting flow communication through such wall. Both the top and bottom walls have their outermost surface adjacent the periphery thereof, recessed, as shown at 56 and 57, respectively.

Three of such valve elements 16 are shown positioned in chamber 22 with a sealing ring 17 disposed between adjacent elements and between an end element and the end face of portion 28 of the solenoid. It will be noted that the radial outer portions of the valve elements are closely adjacent the wall of bore 21 while the inner portions thereof are slightly spaced from the normal diameter surface of spool 8 so as to allow free axial movement of the latter upon solenoid actuation. As illustrated in FIGURES 3 and 4, the lowermost valve 16 is seated on end wall 19.

The seal rings 17 each have a generally flat annular body portion 61 and an outer peripheral portion 62 of enlarged thickness. The inner portion 63 and outer portion 64 are adapted to sealingly engage the spool 14 and bore 21 respectively. The thickened portion 62 adjacent opposed faces of the portion 61 fit into the corresponding recesses 56 and 57 of the valve elements, while the opposing faces of portion 61 engage the outermost faces of the top 51 and bottom 52 of the valves. The axial extent of the bore chamber 22 is such that the rings 17 will be maintained under compression thereby moving radially both outwardly and inwardly and effecting a seal between the spool and the valve body. It may also be noted that the axial extent of the diametrically reduced portions 43 and 44 of the spool is slightly less than the distance between adjacent seal rings.

In operation, and referring to FIGURE 3 of the drawing, it will be seen that the three valve elements are opposite the respective ports 37, 38 and 39, with the rings 17 positioned axially above and below such ports. Due to the openings 54 in the valve walls 53, each port is in communication with the chamber 22 on both sides of the valve walls 53. If spool 14 had a constant diameter engaged by the rings, it would be apparent that no communication could be established between the various ports. However, when one of the spool portions 43 or 44 is aligned with one of the sealing rings, the latter will be radially spaced from the spool and permit free gas or liquid flow therebetween. As shown in the drawing, the sealing rings have been designated as 17a, 17b and 17c, respectively, with ring 17a radially spaced from spool portion 44 intermediate ports 37 and 38, ring 17b engaging spool portion 46 intermediate ports 38 and 39. In such normal position of the parts, it will be clear that if air enters port 38, it will pass through wall 53 of its adjacent valve element. No air can pass upwardly towards port 39 due to the engagement of ring 17b with spool portion 46 intermediate the ports 38 and 39. However, ring 17a is radially spaced from spool portion 44 and air entering port 38 may thus pass such portion 46 and exit through port 37.

Upon solenoid actuation, and movement of the spool to the position shown in FIGURE 4, the ring 17a now engages spool portion 46 while ring 17b is aligned with and radially spaced from the diametrically reduced spool portion 43. This results in a sealing off of communication between ports 38 and 37, and opening communication between ports 38 and 39. Deenergization of the solenoid permits the spring 31 to return the spool to the position shown in FIGURE 3.

In FIGURES 5 and 6 a multivalve unit is illustrated, based on the same concepts as just described, but in which the valve body is provided with five ports indicated at 71, 72, 73, 74 and 76, respectively. There is accordingly provided five valve elements 16, and five seal rings 17d, 17e, 17f, 17g and 17h. Also, the spool has three diametrically reduced portions 81, 82 and 83, with normal size portions 84 and 86 between adjacent reduced portions. It will be noted that the parts are substantially the same as previously discussed, the primary variations being in the axial extent of the chamber 22, the number of valve elements therein and the number of diametrically reduced portions on the spool.

In the normal position of the parts, as shown in FIGURE 5, air or other fluid can pass from port 73 to port 74, and from port 72 to port 71. Solenoid actuation then results in air passing from port 74 to port 76, and from port 73 to port 72. The other ports in both instances are sealed from each other.

It will thus be seen that repeated cyclings can occur by mere axial movement of the spool. By bevelling the shoulders at the junctures of the different diameters of the spool, there is little tendency for the inner wall of the rings 17 to unduly wear, and the construction of the latter and its association with the valve elements insures a radially inward pressure on the rings without any rolling or twisting action.

What is claimed is:
1. A valve including a body provided with a bore therein, a cylindrical rod disposed concentrically in said bore for axial movement therein, means defining a plurality of ports in said bore extending from said bore and axially spaced from each other, a plurality of seal rings in said bore positioned intermediate adjacent ports and having an outer peripheral portion sealingly engaging said body and an inner peripheral portion sealingly engaging said rod, said rod having at least one portion of diametrically reduced size adapted to be aligned with one of said rings in one position of rod movement for permitting fluid flow between such rod portion and such ring, and a plurality of valve elements with one of such elements disposed opposite each of said ports and maintaining the axial spacing of each of said seal rings, each of said elements including a pair of annular members lying in axially spaced planes and a perforate wall opposite its respective port connecting said annular members intermediate the inner and outer edges thereof.

2. Apparatus as set forth in claim 1 in which the outermost surfaces of said annular members are provided with a recess, and said seal ring has a projection adapted to be seated in said recess.

3. A valve including a body provided with a bore therein, a cylindrical rod disposed concentrically in said bore for axial movement therein, means defining a plurality of ports in said body extending from said bore and axially spaced from each other, a plurality of seal rings in said bore positioned intermediate adjacent ports and having an outer peripheral portion sealingly engaging said body and an inner peripheral portion sealingly engaging said rod, said rod having at least one portion of diametrically reduced size adapted to be aligned with one of said rings in one position of rod movement for permitting fluid flow between such rod portion and such ring, a solenoid threadedly engageable with said body, said rod constituting the solenoid spool, and spring means in said body normally urging the spool in one direction.

4. Apparatus as set forth in claim 3 in which a portion of said solenoid releasably encloses one end of said bore with an end of the valve body closing the other end of said bore, a seal ring disposed against said solenoid portion.

References Cited
UNITED STATES PATENTS

| | | | |
|---|---|---|---|
| 1,016,167 | 1/1912 | McCulloch | 137—625.69 |
| 3,152,614 | 10/1964 | Carls | 137—625.69 |
| 3,354,911 | 11/1967 | Fall | 137—625.69 |

M. CARY NELSON, *Primary Examiner.*

ROBERT J. MILLER, *Assistant Examiner.*

U.S. Cl. X.R.

251—363